No. 892,381. PATENTED JUNE 30, 1908.
J. J. McHUGH & A. WADMAN.
TEMPORARY CATTLE STALL.
APPLICATION FILED MAR. 15, 1907.

2 SHEETS—SHEET 2.

Witnesses:
Augt Shirley Bowden
René Bowden

Inventors.
John Joseph McHugh
Albert Wadman

UNITED STATES PATENT OFFICE.

JOHN JOSEPH McHUGH, OF CALGARY, ALBERTA, CANADA, AND ALBERT WADMAN, OF LEWES, ENGLAND.

TEMPORARY CATTLE-STALL.

No. 892,381.  Specification of Letters Patent.  Patented June 30, 1908.

Application filed March 15, 1907. Serial No. 362,585.

*To all whom it may concern:*

Be it known that we, JOHN JOSEPH MC-HUGH, of Calgary, Alberta, in the Dominion of Canada, and ALBERT WADMAN, of Gibraltar, Firle, Lewes, in the county of Sussex, England, have invented certain new and useful Improvements in Temporary Cattle-Stalls, of which the following is a specification.

Our invention more particularly relates to improvements in the construction and arrangement of temporary cattle stalls for cattle boats and vessels used for the transport of cattle, but is likewise applicable to cattle cars and to temporary and permanent lairage at docks, stock yards, exhibitions and the like, and it consists in the novel construction and combination of the parts hereinafter fully described and claimed.

Figure 1:
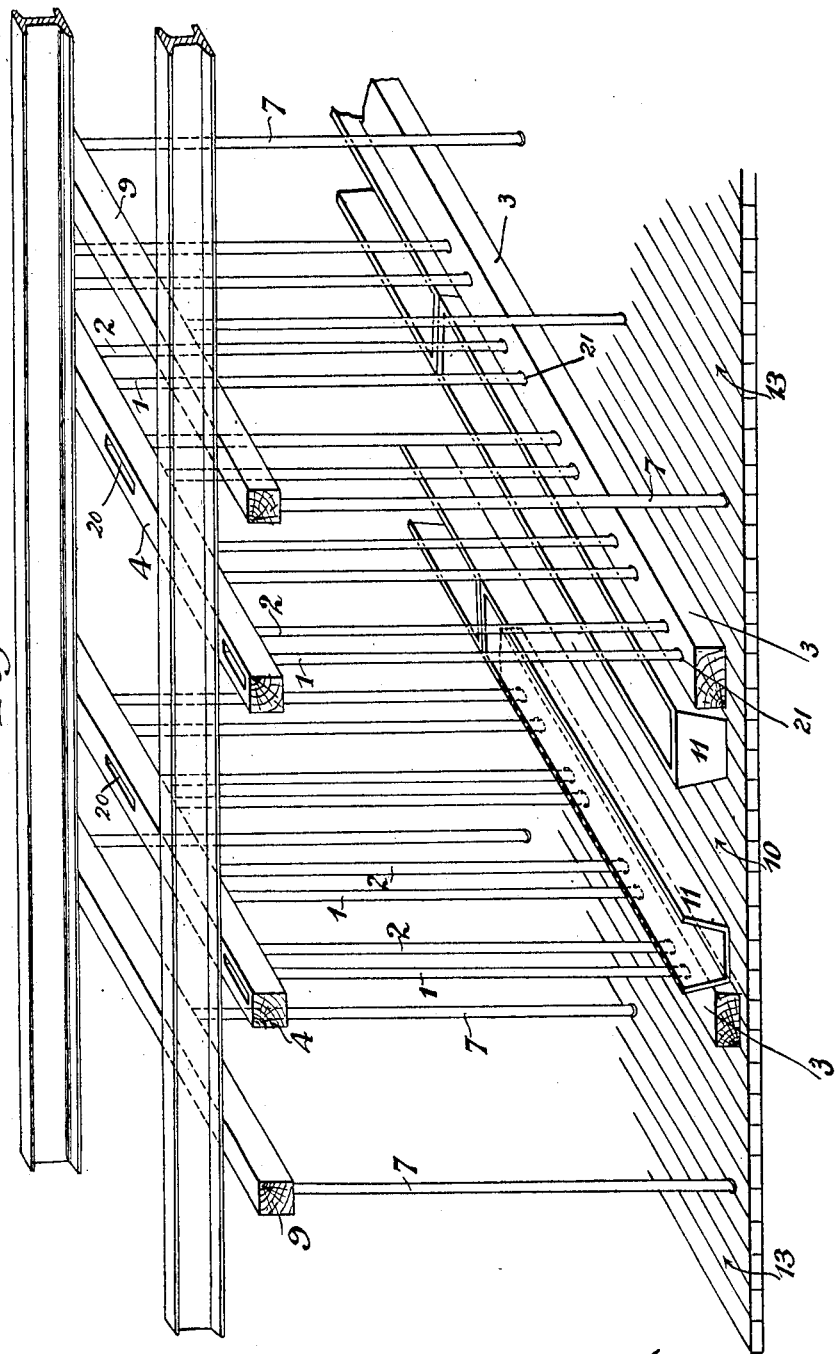
Figure 2:
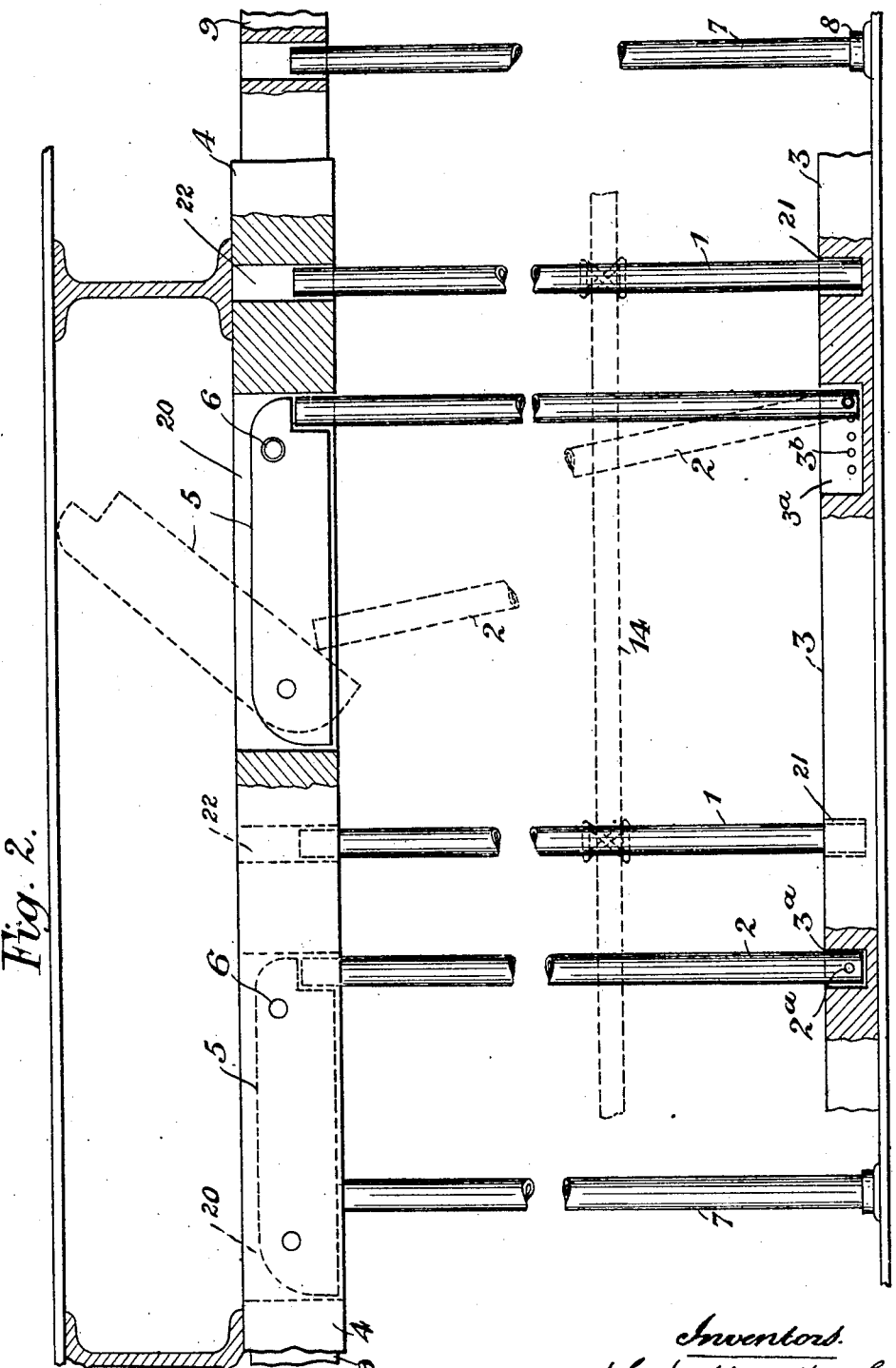

Figure 1 is a perspective view illustrating the general arrangement of such cattle stalls, and Fig. 2 is a front view, partly in section, drawn to a larger scale and showing certain of the uprights and their supports.

1, 2 indicate the removable parallel uprights, 3 indicates the lower sill wherein suitable socket holes 3ª are formed into which the lower ends of such uprights are loosely stepped, while in order to allow of the ready adjustment of the distance between the uprights such socket holes may be enlarged and may have a series of perforations formed therein as indicated at 3ᵇ so that the position of the uprights 2 may be varied as desired. The lower ends of such uprights 2 are preferably secured by pivot pins 2ª as shown in Fig. 2. 4 is the recessed overhead sill wherein the upper ends of the uprights 1, 2 are inserted. Such upper sill is bolted or otherwise secured to the deck joists of the vessel, so as not to encumber it with additional stanchions or other fixtures, but when the stalls are erected in places where there are no available supports for the overhead sills, suitable stanchions or other equivalent permanent or temporary supports are provided. The upright 2 engages with a slotted recess 20 in the upper sill 4, wherein it is locked by a hinged catch 5 or its equivalent, by raising which, such upright may be moved so as to allow of the passage of the animal's head as indicated by dotted lines in Fig. 2, after which said upright is replaced and locked in position by the catch 5, which latter may be secured if desired by a removable pin 6, as illustrated at Fig. 2. The removable upright 1 engages in apertures 21 in the sill 3 and 22 in the sill 4, as indicated, and both the uprights 1 and 2 may be removed from their sockets by raising and drawing them aside.

The stalls are divided off at the back into pairs as shown, by removable stanchions 7, which are stepped in sockets 8, and are held in position by an overhead sill 9, which is bolted to the deck joists or otherwise supported in a similar manner to the overhead sill 4. The said uprights 7 are arranged between each alternate pair of the uprights 2 and 3 and out of line with them, so that the cattle are divided into pairs, and the hindquarters of each pair of cattle are kept in position by two of the uprights 7. The stalls are preferably arranged in opposite rows on either side of a central walk 10, along which suitable removable watering and feeding troughs 11 are arranged. Sufficient space is left behind the removable stanchions 7 to form gangways 13, through which the cattle can be driven into the stalls, and in order to prevent the cattle escaping through the intervening spaces, between the stalls a temporary barrier 14 (indicated by dotted lines in Fig. 2) is lashed or otherwise secured to the stall uprights 1 which barrier is removed when the cattle are secured.

What we claim as our invention is:—

1. The combination, with a stationary lower sill provided with sockets 21 and 3ª, and a stationary upper sill provided with sockets 22 and 20, of a removable upright 1 resting in the socket 21 and slidable vertically in it and in the socket 22, a removable upright 2 pivoted in the socket 3ª and movable laterally of the upright 1 in the socket 20, and a catch which normally prevents the upright 1 from sliding in the said socket 20.

2. The combination, with a stationary lower sill provided with sockets 21 and 3ª, of a stationary upper sill provided with sockets 22 and 20, of a removable upright 1 resting in the socket 21 and slidable vertically in it and in the socket 22, a removable upright 2 pivoted in the socket 3ª and movable laterally of the upright 1 in the socket 20, means for supporting the pivot of the said upright 2 in different positions so as to regulate the distance between the lower parts of the uprights 1 and 2, and a catch which normally prevents the upright 1 from sliding in the said socket 20.

3. The combination, with stationary upper and lower supports, each provided with sockets; of a series of removable uprights 1 and 2 arranged in pairs and adapted to engage with the necks of the animals, each said upright being placed in engagement with certain of the said sockets, and a series of removable uprights 7 arranged between each alternate pair of the said uprights 1 and 2 and out of line with them, said uprights being placed in engagement with certain other of the said sockets and adapted to retain the hindquarters of the animals in position.

JOHN JOSEPH McHUGH.
ALBERT WADMAN.

Witnesses:
AUGT. SHIRLEY BOWDEN,
RENÉ BOWDEN.